United States Patent [19]

Tanaka et al.

[11] Patent Number: 5,130,967
[45] Date of Patent: Jul. 14, 1992

[54] ON/OFF-TRACK DETECTING APPARATUS FOR COMPATIBLE DISK PLAYER

[75] Inventors: Hozumi Tanaka; Ryuichiro Yoshimura; Takeshi Izumo, all of Tokorozawa, Japan

[73] Assignee: Pioneer Electronic Corporation, Tokyo, Japan

[21] Appl. No.: 513,478

[22] Filed: Apr. 23, 1990

[30] Foreign Application Priority Data

May 1, 1989 [JP] Japan .................. 1-113077

[51] Int. Cl.⁵ .......................... G11B 3/90; G11B 17/22
[52] U.S. Cl. ........................ 369/56; 369/53; 369/55; 369/32
[58] Field of Search ............. 369/15, 43, 44.25, 44.27, 369/44.28, 47, 56, 44.26, 44.29, 44.35, 54, 56, 58, 32; 360/19.1, 24, 25

[56] References Cited

U.S. PATENT DOCUMENTS

| | | | |
|---|---|---|---|
| 4,512,002 | 4/1985 | Kosaka et al. | 369/44.25 |
| 4,701,897 | 10/1987 | Nakagawa | 369/43 |
| 4,773,052 | 9/1988 | Sugiura | 369/44.27 |
| 4,794,579 | 12/1988 | Baas | 369/43 |
| 4,855,978 | 8/1989 | Kanamaru | 369/43 |
| 4,860,272 | 8/1989 | Nishikawa | 369/44.28 |
| 4,893,193 | 1/1990 | Nakamura et al. | 369/32 |
| 4,897,827 | 1/1990 | Raetzer et al. | 369/32 |
| 4,964,000 | 10/1990 | Kanota | 369/47 |

FOREIGN PATENT DOCUMENTS

| | | | |
|---|---|---|---|
| 0265849 | 5/1988 | European Pat. Off. | 369/15 |
| 0133075 | 6/1986 | Japan | 369/47 |
| 0178739 | 8/1986 | Japan | 369/44.28 |
| 0029327 | 2/1988 | Japan | 369/44.27 |
| 0175233 | 7/1988 | Japan | 369/44.27 |
| 0237225 | 10/1988 | Japan | 369/44.27 |

*Primary Examiner*—Stuart S. Levy
*Assistant Examiner*—Tan Nguyen
*Attorney, Agent, or Firm*—Sughrue, Mion, Zinn, Macpeak & Seas

[57] ABSTRACT

An on-track and off-track state detecting apparatus in a compatible disk player capable of playing different types of disks, each carrying thereon at least one of a FM audio signal and an EFM signal. The apparatus detects an on-track state and off-track state by comparing the level of the FM audio signal component with a predetermined level, when the disk being played back does not carry the EFM signal, and by comparing the level of the EFM signal component with a predetermined level, when the disk being played back carries the EFM signal thereon. This apparatus commonly uses a level comparator circuit and performs a reliable detection of the respective on-track and off-track states.

8 Claims, 3 Drawing Sheets

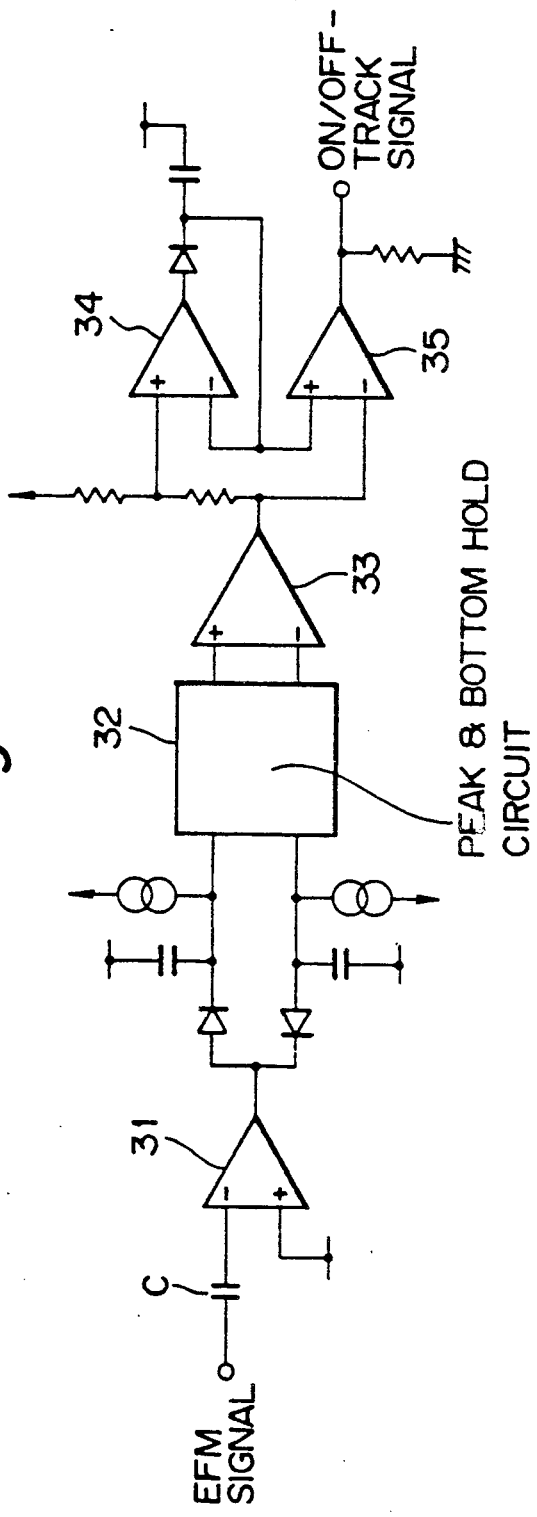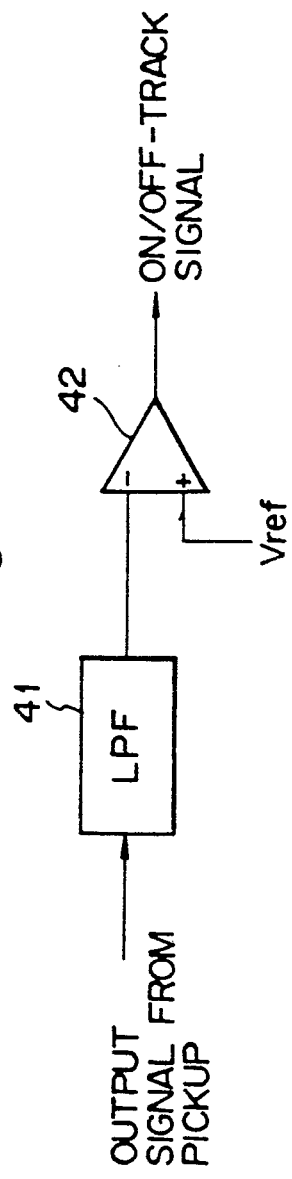

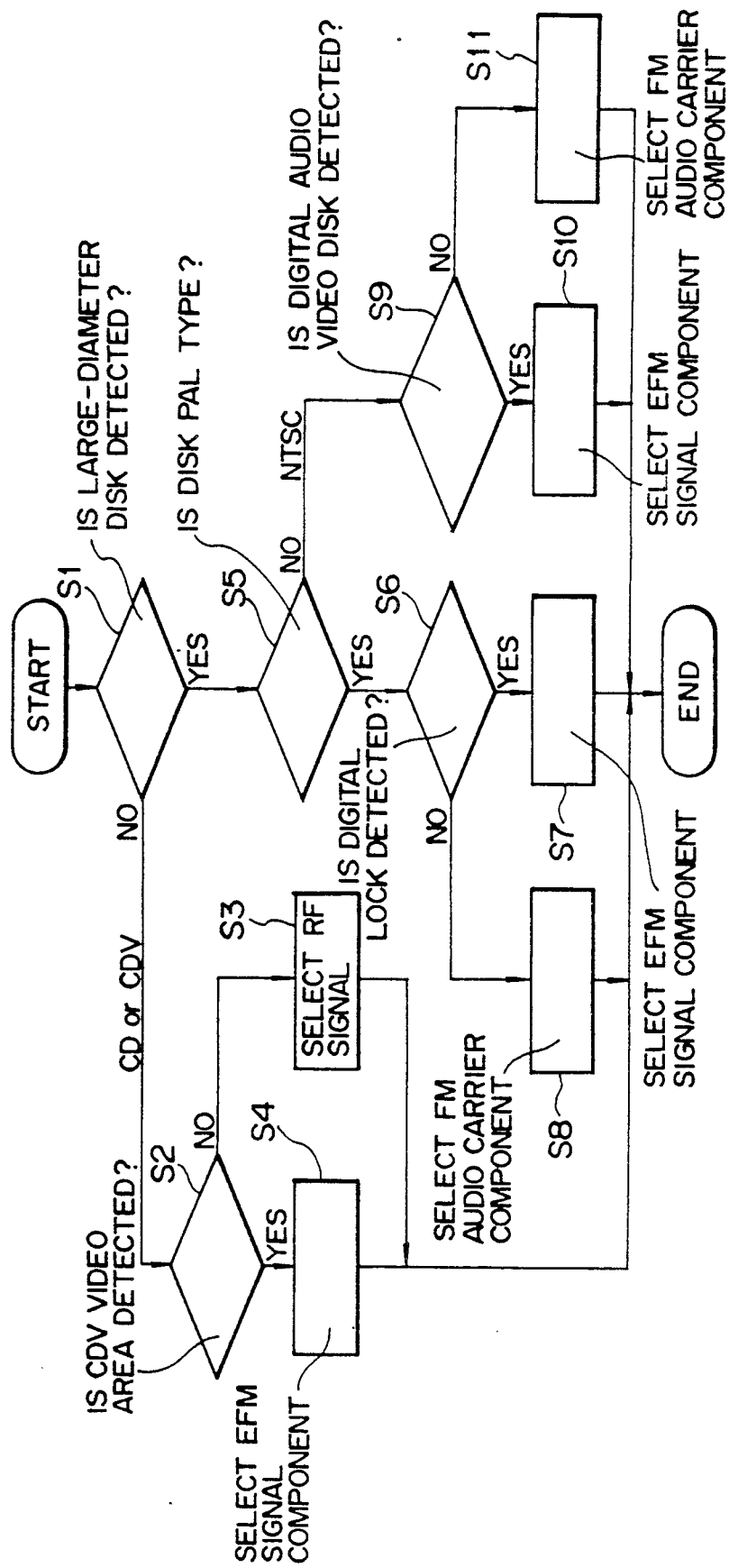

ON/OFF-TRACK DETECTING APPARATUS FOR COMPATIBLE DISK PLAYER

BACKGROUND OF THE INVENTION

1. Field of the Invention

The present invention relates to an on/off-track detecting apparatus that determines whether its information pickup point is on a recording track (pit surface), i.e., in an on-track state, or between recording tracks (mirror surface), i.e., in an off-track state. More particularly, the present invention relates to an on/off-track detecting apparatus for use with a compatible disk player capable of playing different types of information-recorded disks.

2. Description of the Related Art

A currently marketed disk player capable of playing an information recording disk such as a digital audio disk called compact disk (CD), a video disk (VD), etc. is generally equipped with what is known as a track jump function. This function that allows the information pickup point on the disk to skip a plurality of tracks at a time before reaching a desired location. With track jumps involving tens or hundreds of tracks to be skipped, settlement of the tracking actuator takes a relatively long time for because the tracking error signal is liable to exceed a linear operating range of the tracking servo system. To suppress an instable state after each jump, the tracking servo loop includes a braking circuit. This braking circuit applies brakes on the tracking actuator by turning on and off a loop switch for the tracking servo loop at appropriate timings. To determine when to turn on and off the loop switch, the braking circuit requires an on/off-track signal. The signal indicates whether the information pickup point is on a track (on-track state) or off a track (off-track state).

FIG. 1 is a block diagram of an on/off-track detecting circuit. With CD players, as illustrated, an EFM (eight-to-fourteen modulation) signal is read from the disk, forwarded through a DC cut-off capacitor C, and amplified by an amplifier 31. The signal then undergoes a peak and bottom hold operation by a peak and the bottom circuit 32. A difference between the peak and the bottom hold signal is produced by a differential amplifier 33, which provides an envelope signal of the EFM signal. Meanwhile, a hold signal is obtained by a hold amplifier 34 which equals two-thirds of the peak value of the envelope signal. This hold signal is compared in level with the envelope signal by a comparator 35. The result provides an on/off-track signal that goes Low in an on track state and High in an off-track state.

With VD players, the output signal of the pickup varies between on-track and off-track state. For this reason, moving the information pickup point across tracks during a track jump causes the output signal of the pickup to form a sine waveform. FIG. 2 shows another on/off-track detection circuit. As illustrated, the output signal of the pickup is fed to a low-pass filter 41 for removal of the RF component. The output from the filter is fed to a comparator 42. There, the output is compared with a predetermined reference voltage Vref for waveform shaping so as to produce an on/off-track signal.

Currently marketed compatible disk players are capable of playing different kinds of disks such as compact disks and video disks. In these players, if two on/off-track detection circuits are provided for CD and VD use, the circuit configuration becomes complex and the costs thereof are correspondingly high. However, it is impossible to use the VD-use on/off-track detection circuit to detect on-and off-track states through the EFM signal. Similarly conventional CD-use on/off-track detection circuits could not be applied to the RF signal (read from video disk), since the RF frequency is too high for the peak and bottom hold circuit 32 to operate.

In addition to the ordinary video disk with FM video and audio signals recorded thereon in multiplexed form, there are other variations such as a digital audio video disk and a PAL type video disk. The digital audio video disk contains recorded FM video and audio signals overlaid with EFM digital audio signals in CD format. The PAL type video disk contains EFM digital audio signals as its only audio signal. If the digital audio video disk is subjected to on/off-track detection by the above-described VD-use on/off-track detection circuit, the circuit may malfunction due to the presence of the EFM signal recorded in multiplexed form. If the PAL type video disk containing the EFM signal as its only audio signal is handled in the same manner, the EFM signal causes the on/off-track detection circuit to malfunction. In both cases, normal detection of on- and off-track states is unavailable.

SUMMARY OF THE INVENTION

It is therefore the primary object of the present invention to provide an on/off-track detecting apparatus which applies the same detection circuit to different types of disks for positive on/off-track detection in conjunction with compatible disk players.

The on/off-track detecting apparatus according to the invention is incorporated in compatible disk players capable of playing different types of disks, and works as follows. The apparatus first recognizes the type of the currently playing disk. If the disk does not carry any digital audio signal, its FM audio signal component is used for detecting the on-track and off-track states. If the disk contains digital audio signals, its digital audio signal component is used for detecting the on-track and off-track states.

BRIEF DESCRIPTION OF THE DRAWINGS

FIG. 1 is a circuit diagram of an on/off-track detection circuit for use in CD players; and FIG. 2 is a circuit block diagram of an on/off-track detection circuit for use in VD players.

FIG. 4 is a flowchart which describes the procedure for determining a disk type in the preferred embodiment;

DETAILED DESCRIPTION OF PREFERRED EMBODIMENTS

Figure 3:
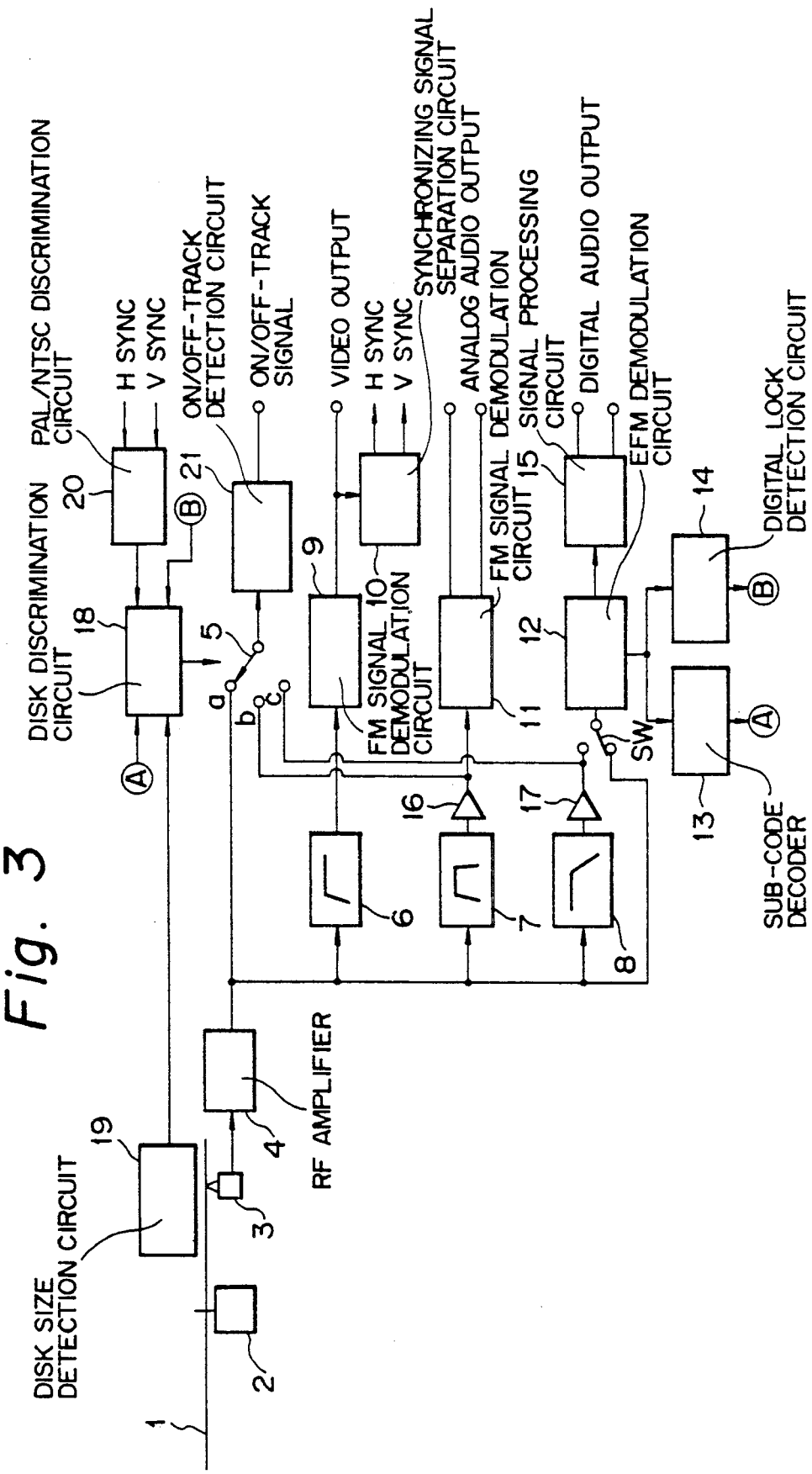
FIG. 3 is a block diagram of a preferred embodiment of the present invention.

There will now be described the preferred embodiment of the present invention while referring to the accompanying drawings. In FIG. 3, a disk 1 is rotated by a spindle motor 2. The information recorded on the disk 1 is read by a pickup 3. The RF signal produced from the pickup 3 is amplified by an RF amplifier 4. The signal then becomes an input to a fixed contact 'a' of a three-input selector switch 5, and is fed to a high-pass filter (HPF) 6, a band-pass filter (BPF) 7 and a low-pass filter (LPF) 8. The HPF 6 extracts, from the RF signal, the FM video carrier component that is generated during the playing of all types of video disks. The BPF 7 extracts, from the RF signal, the FM audio carrier component (2.3–2.8 MHz for the NTSC system, 680–1080 KHz for the PAL system) that is generated during the playing of ordinary video disks. The LPF 8 extracts, from the RF signal, the EFM signal component that is generated during the playing of digital audio video disks and digital audio PAL type video disks.

The FM video carrier component extracted by the HPF 6 is demodulated by an FM signal demodulation circuit 9. The demodulated signal component becomes a video output, and is fed to a synchronizing signal separation circuit 10 at the same time. The circuit 10 separates and extracts a horizontal (H) synchronizing signal and a vertical (V synchronizing signal from the reproduced video signal. The FM audio carrier component extracted by the BPF 7 is demodulated by an FM signal demodulation circuit 11 to become right-hand and left-hand analog audio outputs. The EFM signal component extracted by the LPF 8 is amplified by an amplifier 17 and fed to an input terminal of a switch SW. To the other input terminal of the switch SW is fed the output signal of the RF amplifier 4. The switch SW is controlled by a disk discriminating circuit 18 explained hereinafter so as to relay the output EFM signal of the amplifier 17 during play of a video disk with a digital audio signal or a video region of a CDV disk and the output EFM signal of the amplifier 4 during play of a CD or a CD region of a CDV.

It is to be understood that the EFM signal is attenuated upon recording by about several tens dB in the video disk with digital audio signals and in the video region of the CDV so as to avoid adverse influence by the EFM signal upon a lower frequency component of the FM video signal. Thus, the EFM signal extracted through the LPF 8 is amplified by the amplifier 17.

The EFM signal passed through the switch SW is demodulated by an EFM demodulating circuit 12 and is subjected to error correction. Thereafter, the demodulated signal is supplied to a sub-code decoder 13 and to a digital-lock detecting circuit 14. The demodulated signal is also fed to a signal processing circuit 15 which produces righthand and lefthand digital audio output signals. The sub-code decoder 13 decodes sub-code signals such as the time-code and frame number which are respectively provided per frame of the original digital signal. The digital lock detecting circuit 14 detects the synchronization lock state with respect to the frame synchronization signal.

The FM audio carrier component and the EFM signal component extracted by the BPF 7 and LPF 8, respectively, ar adjusted by amplifiers 16 and 17 so that their levels will match each other. These components then are supplied to fixed contacts 'b' and 'c' of the selector switch 5. The selector switch 5 is controlled by the disk discrimination circuit 18. The circuit 18 is adapted to determine the type of the disk to be played. This circuit may illustratively comprise a microcomputer whose processor may carry out the procedure described below so as to identify the disk type.

In the flowchart of FIG. 4, the processor determines in step S1 whether the current disk is a small-diameter disk (CD or CDV, the latter being a disk comprising both CD and VD areas) or a large-diameter disk (VD) in accordance with a size detecting signal from a disk size detection circuit 19. If the current disk is found to be a small-diameter disk, the processor then determines in step S2 whether the pickup is reading a CD, the CD area of a CDV, or the video area of the CDV depending on the presence or absence of a sub-code detected by the subcode decoder 13. When the pickup is reading a CD or the CD area of a CDV, the selector switch 5 is positioned at the fixed contact 'a' in step S3. This allows the RF signal from the disk 1 to be selectively output unchanged. If the pickup is reading the video area of the CDV, the selector switch 5 is positioned to the fixed contact 'c' in step S4 to selectively output the EFM signal component.

Meanwhile, if the current disk is found to be a large-diameter disk in step S1, the processor then determines in step S5 whether the video disk is of a PAL type or NTSC type in accordance with the discrimination output from a PAL/NTSC discrimination circuit 20. To do its task, the PAL/NTSC discrimination circuit 20 first recognizes the difference in the number of scanning lines between the PAL type and the NTSC type. Using the horizontal and vertical synchronizing signals separated and extracted by the synchronizing signal separation circuit 10, the PAL/NTSC discrimination circuit 20 counts the number of horizontal synchronizing signals between two consecutive vertical synchronizing signals in a reproduced video signal for discrimination between PAL and NTSC type. It is to be understood that these discriminating operations constitute one example of the PAL/NTSC discrimination process and other alternatives are also possible.

When the result of the discrimination process indicates a PAL type video disk, then a check is made in step S6 to see if the disk has EFM or FM audio signals recorded on it. The decision is made depending on whether the digital lock detection circuit 14 has detected a digital lock. If the disk contains EFM audio signals, the selector switch 5 is set to the fixed contact 'c' in step S7 to selectively output the EFM signal component. If the disk contains FM audio signals, the selector switch 5 is set to the fixed contact 'b' in step S8 to selectively output the FM audio carrier component.

On the other hand, if the result of the discrimination process indicates an NTSC type video disk, then a check is made in step S9 to see if the disk is a video disk with the EFM audio signal recorded in a multiplex form on the whole area thereof, an ordinary video disk or one that has EFM audio signals recorded on a restricted area thereof. The decision is made depending o whether the sub-code decoder 13 has detected a sub-code. If the currently played disk is a digital audio video disk, the selector switch 5 is set to the fixed contact 'c' in step S10 to selectively output the EFM signal component. If the disk is an ordinary video disk or a video disk with the EFM signal partly recorded, the selector switch 5 is set to the fixed contact 'b' to selectively output the FM audio carrier component (step S11).

The FM audio carrier component or EFM signal component from the RF signal is selected by the selector switch 5 and fed to an on/off-track detection circuit 21. The circuit 21, a typical configuration of which is shown in FIG. 1, checks to see if the information pickup point is on a track (on-track state) or between tracks (off-track state). The on/off-track signal detected by the on/off-track detection circuit 21 is illustratively provided as a signal to a braking circuit (not shown) that turns on and off a loop switch of a tracking servo loop at appropriate timings to apply brakes on the tracking actuator during track jumps involving tens or hundreds of tracks to be skipped.

In the manner described above, the compatible disk player capable of playing different types of disks determines the type of the disk to be played and plays the disk accordingly. When the disk or disk area without any EFM audio signal or with EFM audio signal partly recorded on it is played, the FM audio carrier component is extracted; when the disk or disk area with EFM digital audio signals recorded on it is played, the EFM signal component is extracted. The varying signal level of each signal component is detected in magnitude to determine on-track and off-track states. This setup constitutes a circuit capable of discriminating different types of disks. Since signals of substantially similar frequency components are fed as input signals to the circuit, correct detection of on- and off-track states is ensured for various disk types. As a result, the tracking actuator is settled securely and reliably by its braking circuit after each track jump.

As indicated above, the on/off-track detecting apparatus according to the present invention first discriminates the type of the disk to be played. If the currently played disk is one with a digital audio signal recorded on the whole recording area thereof, the digital audio signal component is used for the detection of on-and off-state. If the currently played disk is another than the above, the FM audio signal component is used for the particular detection. Thus the same detection circuit is shared for detection of various disk types. In addition, correct detection of on- and off-track states is ensured for various disks.

What is claimed is:

1. An on-track and off-track state detecting apparatus in a compatible disk player capable of playing different types of disks each carrying thereon an RF signal having at least one of an FM video signal, an FM audio signal and a digital audio signal, which comprises:
    on-track and off-track state signal generating means for producing an off-track and on-track signal by comparing an amplitude of a signal obtained through envelope-detection of an input signal supplied thereto with a predetermined level;
    means for filtering said FM video signal from said RF signal read from said disk; and
    switch means for supplying said digital audio signal read from a disk being played back to said on-track and off-track state signal generating means when the disk being played is determined as a first type of disk with said digital audio signal recorded throughout a recording area thereof and for supplying said FM audio signal read from said disk through said filter means to said on-track and off-track state signal generating means when the disk is determined as a type of disk other than said first type of disk.

2. An on-and off-track state detecting apparatus according to claim 1, which further comprises:
    an extracting means for extracting said digital audio signal component from a read signal from a disk being played back;
    an amplifier for amplifying said digital audio signal extracted by said extracting means,
    said switch means being adapted to supply the digital audio signal passed through said amplifier as said input signal to said on track and off-track state detecting circuit when it determines that the disk being played back is one type of disk with a FM video signal and a digital audio signal recorded in a multiplex form.

3. An on- and off-track state detecting apparatus according to claim 1, in which said on-and off-track state signal generating means includes an envelope circuit for envelope-detecting said input signal, and a comparator for comparing an output signal from said envelope-detecting circuit with a predetermined level.

4. An on- and off-track state detecting apparatus according to claim 3, in which said envelope detecting circuit included an amplifier for amplifying an AC component of said input signal; an peak and bottom hold circuit for holding the respective peak and bottom levels of an output signal from said amplifier; and a subtractor for obtaining a difference between the peak and bottom levels held by said peak and bottom hold circuit so as to produce an output signal representing said difference.

5. An on- and off-track state detecting apparatus according to claim 2, in which said switch means includes:
    discrimination means for determining that a disk being played back is one type of disk with said digital audio signal recorded on the whole recording area thereof in dependence upon an output signal from a sub-code decoder for decoding the sub-code signal contained in said digital audio signal from said extracting means; and
    a selector switch for relaying to said on- and off-track state detecting circuit the selected one of said digital audio signal and said FM audio signal in accordance with the output signal of said discrimination means.

6. An on- and off-track state detecting apparatus according to claim 5, in which said discrimination means performs its discrimination operation in accordance with disk-size information.

7. An on-track and off-track state detecting apparatus in a compatible disk player capable of playing different types of disks each carrying thereon at least one of an FM audio signal and a digital audio signal, which comprises:
    on-track and off-track state signal generating means for producing an off-track and on-track signal by comparing an amplitude of a signal obtained through envelope-detection of an input signal supplied thereto with a predetermined level;
    switch means for supplying said digital audio signal read from a disk being played back to said on-track and off-track state signal generating means when the disk being played is determined as a first type of disk with said digital audio signal recorded throughout a recording area thereof and for supplying said FM audio signal read from said disk to said on-track and off-track state signal generating means when the disk is determined as a type of disk other than said first type of disk;
    an extracting means for extracting said digital audio signal component from a read signal from a disk being played back; and
    an amplifier for amplifying said digital audio signal extracted by said extracting means,
    said switch means being adapted to supply the digital audio signal passed through said amplifier as said input signal to said on-track and off-track state detecting circuit when it determines that the disk being played back is one type of disk with a FM video signal and a digital audio signal recorded in a multiplex form.

8. An on-track and off-track state detecting apparatus in a compatible disk player capable of playing different types of disks each carrying thereon at least one of an FM audio signal and a digital audio signal, which comprises:

on-track and off-track state signal by comparing an amplitude of a signal obtained through envelope-detection of an input signal supplied thereto with a predetermined level; and switch means for supplying said digital audio signal read from a disk being played back to said on-track and off-track state signal generating means when the disk being played is determined as a first type of disk with said digital audio signal recorded throughout a recording area thereof and for supplying said FM audio signal read from said disk to said on-track and off-track state signal generating means when the disk is determined as a type of disk other than said first type of disk;

said on-track and off-track state signal generating means including an envelope detecting circuit for envelope-detecting said input signal, and a comparator for comparing an output signal from said envelope-detecting circuit with a predetermined level; wherein said envelope detecting circuit includes an amplifier for amplifying an AC component of said input signal; a peak and bottom hold circuit for holding the respective peak and bottom levels of an output signal from said amplifier; and a subtractor for obtaining a difference between the peak and bottom levels held by said peak and bottom hold circuit so as to produce an output signal representing said difference.

* * * * *